United States Patent [19]
Callay

[11] Patent Number: 5,610,923
[45] Date of Patent: Mar. 11, 1997

[54] METHOD AND DEVICE FOR FINDING SPURIOUS MAINTENANCE MESSAGES

[75] Inventor: Christian Callay, Levignac, France

[73] Assignee: Aerospatiale Societe Nationale Industrielle, Paris, France

[21] Appl. No.: 377,609

[22] Filed: Jan. 25, 1995

[30] Foreign Application Priority Data

Feb. 1, 1994 [FR] France .................... 94 01062

[51] Int. Cl.$^6$ .................................................. G06F 11/00
[52] U.S. Cl. ........................................................ 371/5.1
[58] Field of Search .................... 371/5.1, 5.2, 67.1, 371/48; 395/184.01, 185.01

[56] References Cited

U.S. PATENT DOCUMENTS

| | | | |
|---|---|---|---|
| 4,635,030 | 1/1987 | Rauch | 340/52 |
| 5,111,402 | 5/1992 | Brooks et al. | 364/424.04 |
| 5,138,616 | 8/1992 | Wagner, Jr. et al. | 371/5.1 |
| 5,237,677 | 8/1993 | Hirosawa et al. | 395/575 |
| 5,384,565 | 1/1995 | Cannon | 340/825.44 |

FOREIGN PATENT DOCUMENTS

WO91/09482 6/1991 WIPO.

*Primary Examiner*—Robert W. Beausoliel, Jr.
*Assistant Examiner*—Phung My Chung
*Attorney, Agent, or Firm*—Fisher, Christen & Sabol

[57] ABSTRACT

A device (1) for determining whether a maintenance message generated during an operating cycle of a system by a maintenance device (2) monitoring the system is or is not representative of a real fault in the system. The device (1) includes a comparator (D) which compares a short-term occurrence rate of the message to a long-term occurrence rate of the message, for each maintenance message generated, and determining whether the message is or is not representative of a real fault. The occurrence rates are calculated by a computer (CAL) on the basis of information contained in memories (M1, M2, MN) and indicate the presence or non-presence of the message in the course of predicting cycles.

5 Claims, 1 Drawing Sheet

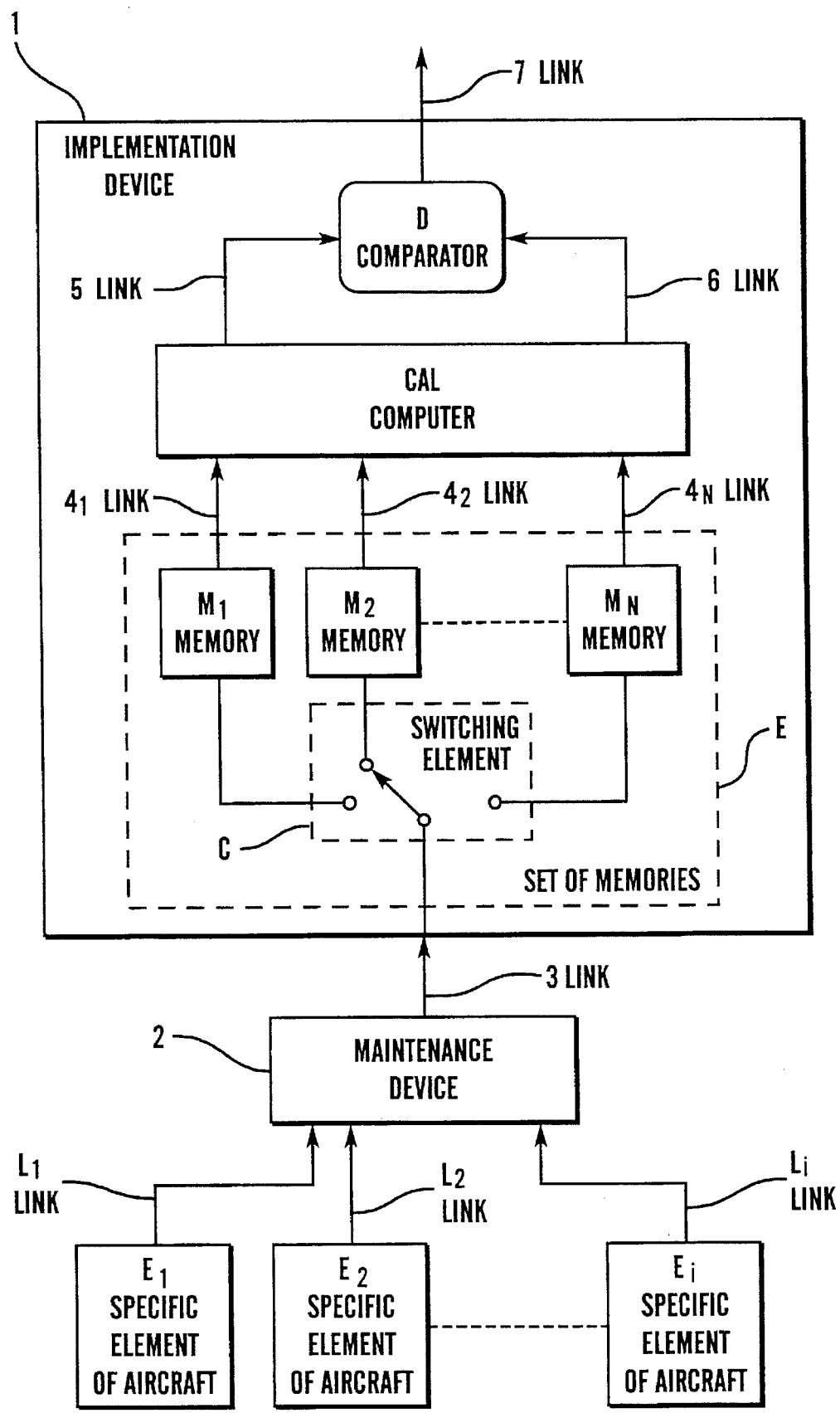

METHOD AND DEVICE FOR FINDING SPURIOUS MAINTENANCE MESSAGES

BACKGROUND OF THE INVENTION

1. Field of the Invention

The present invention relates to a method for determining whether a maintenance message indicating a fault in a system is or is not representative of a real fault in said system, as well as a device for implementing this method.

2. Background Art

It is known that, in very varied fields of activity, such as, for example, in industry, motoring or aviation, there exist centralized maintenance devices associated with systems which are designed and intended to assist maintenance operations for returning said systems to operational condition, at the end of an operating cycle. In the context of the present invention, operating cycle is understood to be a defined operating duration of the associated system and characterized by at least partial shutting-down of said system, at the end of a cycle, in order to carry out the necessary maintenance operations. By way of example, it may relate to a flight for an aircraft or of a constant defined duration, for example the duration of an item of work, for a machine in industry.

One of the main functions of a centralized maintenance device is to supply a maintenance report on the operation carried out, at the end of an operating cycle. This maintenance report consists of a list of maintenance messages, each of said maintenance messages identifying at least one element of the system, which is faulty and which therefore has to be replaced.

By reason of the generally high number of elements monitored and of the complexity of the systems in question, the list of maintenance messages often comprises a certain number of spurious messages. A message is considered as spurious, in the context of the present invention, when it is not representative of any real fault in the system.

The object of the present invention is thus to determine whether a maintenance message generated is representative of a real fault in the system or whether this message is spurious.

Hence, although the present invention is applicable to various systems, it will be described more particularly below in the context of an aircraft, the operation of which is monitored by a centralized maintenance device.

It will be noted that, in the case of an aircraft, many elements are generally replaced although no fault exists. The cost of such unjustified removals, over the duration of use of an aircraft, may be evaluated at about 5 to 10% of the purchase price of the aircraft.

Thus, considerable efforts are made to eliminate spurious maintenance messages. They consist mainly in understanding the causes of these spurious messages by seeking to identify the imperfections in the models used in the fault detection and then to correct these models. In the case of an aircraft, such corrections make it possible to pass from a few tens of spurious maintenance messages (out of several thousands of possible messages) to a few spurious messages per flight.

However, the identification and thus the correction of the imperfections in the models used are often limited by the impossibility of reproducing certain phenomena in the laboratory. In certain cases, the solution would require the introduction of new parameters which are not available in the system used and thus of major and extremely costly modifications of the system.

So as further to reduce the spurious messages, one recommended solution consists, by passive filtering, in definitively eliminating these spurious messages from the maintenance report. This solution exhibits numerous drawbacks, in particular:

the operator tasked with the maintenance no longer has information in the maintenance report when real faults appear in elements, from which the associated maintenance message has been eliminated;

the list of spurious messages to be eliminated must be manually updated when new cases arise; and as all the messages may, a priori, be spurious one day, the list of the messages to be eliminated never stops growing, and thus the maintenance report rapidly risks losing any benefit.

According to a later solution used, manual tests for fault confirmation are carried out by the maintenance operators so as to identify the remaining spurious messages. The drawbacks of these manual tests are many.

In particular, said tests entail time being wasted, and sometimes even delays in the departure of the aircraft, when they are numerous and have to be repeated frequently.

BROAD DESCRIPTION OF THE INVENTION

The object of the present invention is to remedy these drawbacks. It relates to a method making it possible to determine directly, with a high level of confidence, whether a maintenance message is spurious or not.

To this end, according to the invention, the method for determining whether a maintenance message generated, during an operating cycle of a system, by a maintenance device monitoring said system, is representative of a real fault in said system or whether this maintenance message is spurious, is noteworthy in that, at the end of said operating cycle:

a long-term occurrence rate of said maintenance message is determined, on the basis of the results of a number N of preceding cycles, the occurrence rate corresponding to the average probability of occurrence, that is to say of generation, of said maintenance message in the course of a cycle;

a short-term occurrence rate of said maintenance message is determined, at the most on the basis of the results of the last N cycles;

said short-term occurrence rate is compared with said long-term occurrence rate; and it is deduced therefrom:

if the short-term occurrence rate is higher than the long-term occurrence rate, then said maintenance message is representative of a real fault in the system; and otherwise, that said maintenance message is spurious.

Thus, by virtue of the invention, it becomes possible to indicate directly, whatever the type of message, whether this message is spurious or not, the invention applying equally, in particular, to messages which are not reproducible in the laboratory.

Moreover, no maintenance message is definitively eliminated, and no manual update is necessary, in contrast to the abovementioned known solutions.

The invention is based on the observation that the appearance over time of a spurious message is not completely random. In fact, the spurious message results from an imperfection in the model which has generated it. This imperfection is constant and is revealed in particular conditions. The spurious message is therefore generated each time these particular conditions are fulfilled. As the operational use of an aircraft obeys rules which are sufficiently precise and repetitive that, over a defined number of flights, the spurious messages appear in a regular way, there exists an average occurrence rate related to each spurious message, which explains the reason for and the interest in calculating this rate in the method in accordance with the invention.

It will be noted moreover that the faults likely to appear on a system may be either continuous or intermittent, that is to say that they appear only under certain specific, but repetitive, conditions. In the known solutions, intermittent faults are mingled with spurious messages and they therefore risk not being repaired.

In contrast, by the method in accordance with the invention, intermittent faults are clearly recognized and can therefore be repaired. In fact, as the messages associated with intermittent faults follow the same rules as spurious messages, there exists an average occurrence rate related to each of these messages. In the event of a fault, the average rate of the message relating to this fault is added to the average rate of the same message when it is spurious. This variation in rate then makes it possible to identify the presence of a justified message, that is to say one associated with a real fault in the system.

Said long-term and short-term occurrence rates may be adapted to the nature and the characteristics of the system monitored, in particular by using one of the following two possibilities for calculating the long-term occurrence rate.

According to a first possibility, said long-term occurrence rate is equal to the ratio between the number of occurrences of said maintenance message during the N cycles considered and said number N of cycles. For a given message, the precision of this ratio increases with the number of cycles considered.

According to a second possibility, said long-term occurrence rate is a dependent function of the number K of occurrences of said maintenance message during the N cycles observed.

Advantageously, said long-term occurrence rate T1 is, for example, defined from the ratio $(k-1)/(fe(k)-1)$, $fe(k)$ representing the number of cycles necessary to obtain k occurrences and, more precisely, by the relation $$T1 = a5 \times \left( \frac{k-1}{fe(k)-1} \right)^{a6} + a7$$

in which a5, a6 and a7 represent constants.

As this long-term occurrence rate is an item of statistical data, it is all the more precise the higher the number of cycles observed, N. This is why, since the short-term occurrence rate has to be calculated on the basis of the smallest possible number of cycles so as to respond rapidly to any variation, it appears appropriate to determine said short-term occurrence rate differently on the basis of an appropriate method of calculation.

Moreover, it will be noted, in particular for reasons of implementation of the invention, that it is often desirable to calculate said long-term and short-term occurrence rates on the basis of the same number of cycles.

Thus, in order to satisfy the abovementioned conditions, said short-term occurrence rate Tc is calculated according to the invention on the basis of the relation $$Tc = \sum_{n=1}^{n=k} Pn$$

in which k represents the number of occurrences of the maintenance message during the last N cycles and Pn is defined on the basis of dr(n) which represents, for an occurrence n, the number of cycles since the preceding occurrence n−1.

For preference, Pn is calculated from the mathematical formula $$Pn = \frac{a1}{df(n)} - a2 \times (df(n) - 1) - a3 \times fe(n) - a4 \times n$$

in which fe(n) represents the number of cycles necessary to obtain n occurrences, and a1, a2, a3 and a4 are constants.

It will be noted that it is possible, and sometimes necessary, to introduce limitations on the range of variation of Pn so as to avoid possible divergences in the short-term occurrence rate, related to the characteristics of certain systems.

The present invention also relates to a device for implementing the abovementioned method.

According to the invention, said device which is associated with a maintenance device monitoring a system and generating maintenance messages during each operating cycle of said system, and which includes a set of memories, each of said memories being associated with a particular operating cycle, being informed at the end of said operating cycle of the list of maintenance messages generated in the course of this cycle and recording this information, advantageously includes:

a computer (CAL) linked to said set of memories, calculating, at the end of a cycle, for each maintenance message generated in the course of this cycle, the long-term and short-term occurrence rates of said maintenance message on the basis of the information recorded in said set of memories; and a comparator linked to said computer, comparing the calculated short-term occurrence rate to the calculated long-term occurrence rate for each maintenance message generated, determining whether the message considered is spurious or not, and communicating this result.

BRIEF DESCRIPTION OF THE INVENTION

In the drawing:

FIG. 1 is a block diagram of a device according to the invention.

The single FIGURE of the attached drawing will give a good understanding of how the invention can be produced. This FIGURE shows the block diagram of a device in accordance with the invention for determining whether a maintenance message is spurious or not.

DETAILED DESCRIPTION OF THE INVENTION

The device 1, in accordance with the invention and represented diagrammatically in the single FIGURE of the drawing, is intended to be installed on board an aircraft, not represented, and to be associated with a maintenance device 2 also on board, said maintenance device 2 monitoring i specific elements E1 to Ei of the aircraft which are linked to said maintenance device 2 by means of links of L1 to Li.

At the end of the flight, said maintenance device 2 draws up a maintenance report formed by a list of maintenance messages, each of said maintenance messages identifying an element E1 to Ei of the aircraft which is faulty and has to be replaced.

The role of the device 1 in accordance with the invention is, for each of said messages of the maintenance report, to determine whether it is spurious or not, that is to say to investigate whether the element E1 or E2, . . . or Ei associated with said message really is faulty or whether the generation of this message arises from an imperfection in the theoretical models used by the maintenance device 2 for fault investigation, and not from a real fault in said associated element E1 or E2, . . . or Ei of the aircraft.

To this end, said device 1 in accordance with the invention includes a set E of memories M1 to MN, a computer CAL and a comparator D.

Said set E of memories M1 to MN is linked, by means of a link 3, to said maintenance device 2 which, at the end of flight, sends the list of maintenance messages. With each of said memories M1 to MN a particular flight is associated, that is to say that said memories each store information relating to one flight. The number of memories is equal to the number Nmax of flights for which it is desired to keep information. When Nmax flights have been observed, the memory associated with the oldest flight is reused, which makes it possible always to keep the information gathered during the last Nmax flights in the set E of memories M1 to MN.

At the end of flight, the memory associated with said flight, namely the memory M2 in the example represented, receives the list of maintenance messages from the maintenance device 2, via the link 3 which is linked to the corresponding memory M2 with the aid of a switching element C. For each new flight, said switching element C links the maintenance device 2 to another memory of the set E of memories M1, M2, . . . , MN, and, more precisely, to the memory associated with the oldest flight when all the memories have been used.

Said memories M1, M2, . . . , MN are, moreover, linked by means of links 41, 42, . . . , 4N to said computer CAL.

The memories, for which the maintenance message being processed is present in the course of the associated flight, send information to said computer CAL which then calculates the long-term and short-term occurrence rates of this message, on the basis of the information stored in said memories.

According to the invention, each of said memories, for the flight which is associated with it, in fact knows the positive or negative response relating to the generation of a given maintenance message for this flight.

Said computer CAL then, on the basis of the results recorded during the last N flights, calculates the short-term occurrence rate Tc, for example with the aid of the relation $$Tc = \sum_{n=1}^{n=k} Pn$$

in which k represents the number of occurrences of the message during the N flights observed, and Pn is calculated from the mathematical formula $$Pn = \frac{a1}{df(n)} - a2 \times (df(n) - 1) - a3 \times fe(n) - a4 \times n$$

in which:
df(n) represents the number of flights, for an occurrence n, since the preceding occurrence n−1;
fe(n) represents the number of flights necessary since the start of the N flights to reach the occurrence n; and a1, a2, a3 and a4 are constants determined empirically, for example, in the laboratory, which makes it possible to adapt said mathematical formula to the type and the operating conditions of the aircraft. It is possible, for example, to set these constants in order no longer to filter the maintenance messages the long-term occurrence rate of which is lower than a given value.

Limits are then introduced on the range of variation in Pn.

As no preceding occurrence exists for n=1, a constant value will be taken for df(1).

It will be noted moreover that:
a1/df(n) is all the larger the closer the successive messages are;
a2×(df(n)−1) makes it possible to subtract the flights for which no occurrence of the maintenance message exists;
a3×fe(n) allows weighting as a function of the number of flights (knowing that, for a high number of flights, the probability is higher, than for a small number of flights, that an occurrence is representative of a fault); and
a4×n allows weighting as a function of the number n of occurrences.

Obviously, other weighting terms may be taken into account in order yet further to refine said mathematical formula used for the calculation of the short-term occurrence rate Tc.

It is obviously possible, for implementing the invention, to use a mathematical formula other than the one indicated previously.

Said computer CAL also calculates the long-term occurrence rate of each of the maintenance messages generated in the course of the flight in question. This long-term occurrence rate may be either a constant value or a variable function.

For example, the long-term occurrence rate may be equal to the ratio between the number of occurrences of a maintenance message during the N flights considered and said number N of flights.

According to another possibility, the long-term occurrence rate T1 may be a function, for example of the type $$T1 = a5 \times \left( \frac{k-1}{fe(k)-1} \right)^{a6} + a7$$

in which a5, a6 and a7 represent constants.

T1 thus depends on the number k of occurrences of the message during the N flights observed.

For each of the messages of the maintenance report, said comparator D receives from said computer CAL the calculated short-term occurrence rate Tc, via a link 5, and, via a link 6, receives the long-term occurrence rate T1 which is also calculated, as previously described.

Said comparator D then, for each of these maintenance messages, compares said long-term occurrence rate T1 with said short-term occurrence rate Tc and deduces therefrom:
if Tc is higher than T1, that said maintenance message is representative of a real fault in the element of the aircraft associated with said message; and
if Tc is less than or equal to T1, that said maintenance message is spurious.

It transmits this result, via a link 7, to user devices which are not represented, for example to a display device or to a printer which, for example, may draw up a new list of maintenance messages including only the messages representative of a real fault, that is to say the name of the elements E1, E2, . . . , Ei which really are faulty.

It will be noted that the device in accordance with the invention reveals its full effectiveness only when the number of flights observed has reached a certain value, the first flights of the operation of said device possibly being considered as flights for refining the analysis.

What is claimed is:

1. A method for determining whether a maintenance message generated, during an operating cycle of a system, by a maintenance device monitoring said system, is representative of a real fault in said system or whether this maintenance message is spurious, wherein, at the end of said operating cycle, the method comprising the steps of:

(a) determining a long-term occurrence rate of said maintenance message, on the basis of the results of a number N of preceding cycles, the occurrence rate corresponding to the average probability of occurrence, that is, to say of generation, of said maintenance message in the course of a cycle, said long-term occurrence rate being equal to the ratio between the number of occurrences of said maintenance message during the N cycles considered and the number of N cycles;

(b) determining a short-term occurrence rate of said maintenance message, at the most on the basis of the results of the last N cycles, and wherein said short-term occurrence rate Tc is calculated on the basis of the relation:

$$Tc = \sum_{n=1}^{n=k} Pn$$

in which k represents the number of occurrences of the maintenance message during the last N cycles and Pn is defined on the basis of df(n) which represents, for an occurrence n, the number of cycles since the preceding occurrence n−1;

(c) comparing said short-term occurrence rate with said long-term occurrence rate; and (d) deducing therefrom:

(i) if the short-term occurrence rate is higher than the long-term occurrence rate, that said maintenance message is representative of a real fault in the system; and (ii) otherwise, that said maintenance message is spurious.

2. The method as claimed in claim 1, wherein Pn is calculated from the mathematical formula:

$$Pn = \frac{a1}{df(n)} - a2 \times [df(n) - 1] - a3 \times fe(n) - a4 \times n$$

in which fe(n) represents the number of cycles necessary to obtain n occurrences, and a1, a2, a3 and a4 are constants.

3. A method for determining whether a maintenance message generated, during an operating cycle of a system, by a maintenance device monitoring said system, is representative of a real fault in said system or whether this maintenance message is spurious, wherein, at the end of said operating cycle, the method comprising the steps of:

(a) determining a long-term occurrence rate of said maintenance message, on the basis of the results of a number N of preceding cycles, the occurrence rate corresponding to the average probability of occurrence, that is, to say of generation, of said maintenance message in the course of a cycle, said long-term occurrence rate being a dependent function of the number k of occurrences of said maintenance message during the N cycles observed, said long-term occurrence rate T1 being defined by the relation:

$$T1 = a5 \times \left[ \frac{k-1}{fe(k)-1} \right]^{a6} + a7$$

in which a5, a6 and a7 represent constants, and wherein fe(k) represents the number of cycles necessary to obtain k occurrences;

(b) determining a short-term occurrence rate of said maintenance message at the most on the basis of the results of the last N cycles;

(c) comparing said short-term occurrence rate with said long-term occurrence rate; and (d) deducing therefrom:

(i) if the short term occurrence rate is higher than the long-term occurrence rate, that said maintenance message is representative of a real fault in the system; and (ii) otherwise, that said maintenance message is spurious.

4. The method as claimed in claim 3, wherein said short-term occurrence rate Tc is calculated on the basis of the relation:

$$Tc = \sum_{n=1}^{n=k} Pn$$

in which k represents the number of occurrences of the maintenance message during the last N cycles and Pn is defined on the basis of df(n) which represents, for an occurrence n, the number of cycles since the preceding occurrence n−1.

5. The method as claimed in claim 4, wherein Pn is calculated from the mathematical formula:

$$Pn = \frac{a1}{df(n)} - a2 \times [df(n) - 1] - a3 \times fe(n) - a4 \times n$$

in which fe(n) represents the number of cycles necessary to obtain n occurrences, and a1, a2, a3 and a4 are constants.

* * * * *